(No Model.)
5 Sheets—Sheet 1.
H. L. MÜLLER.
COMBINED GAS ENGINE AND CARBURETING APPARATUS.
No. 288,952.
Patented Nov. 20, 1883.
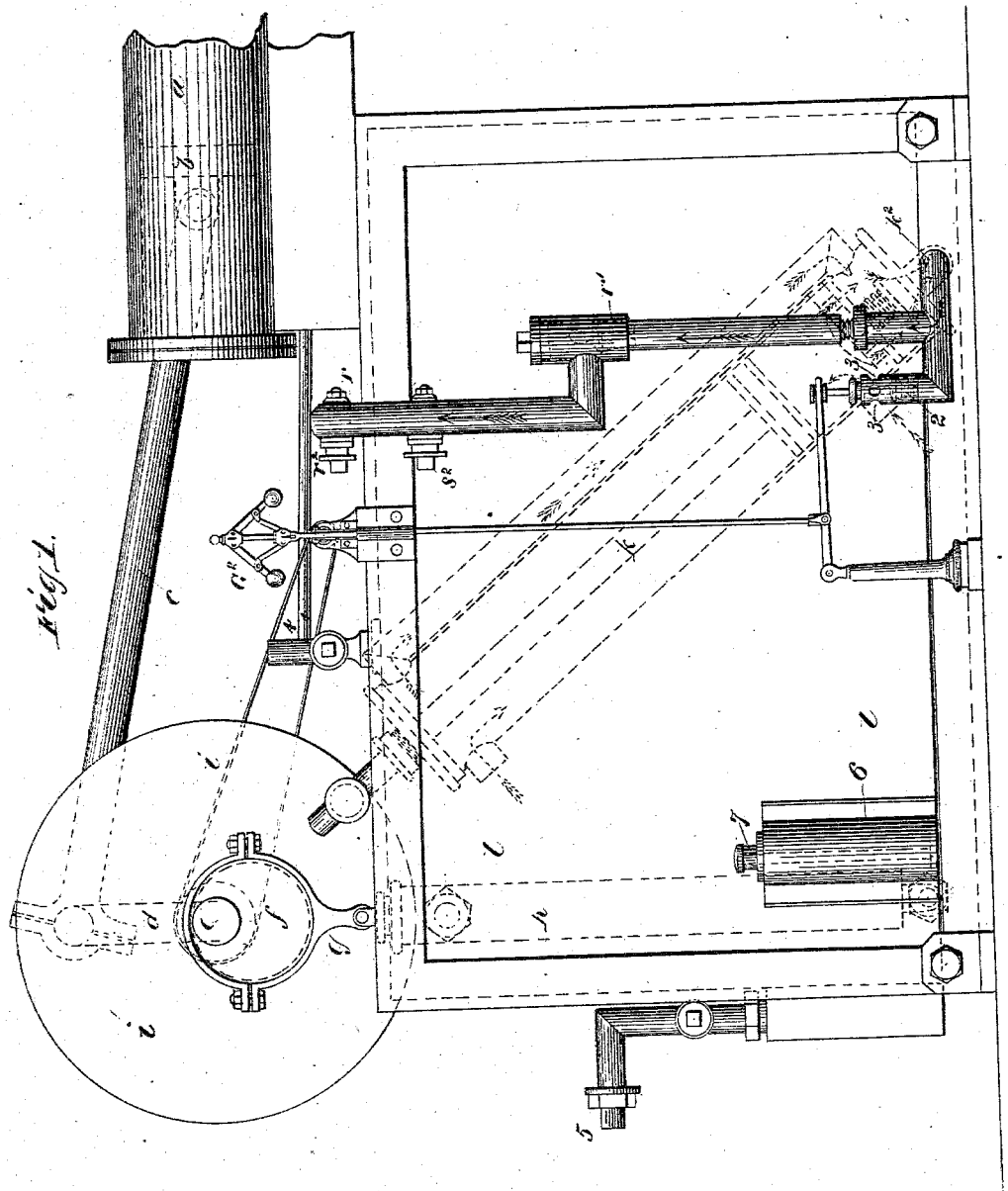
Attest.
Inventor.

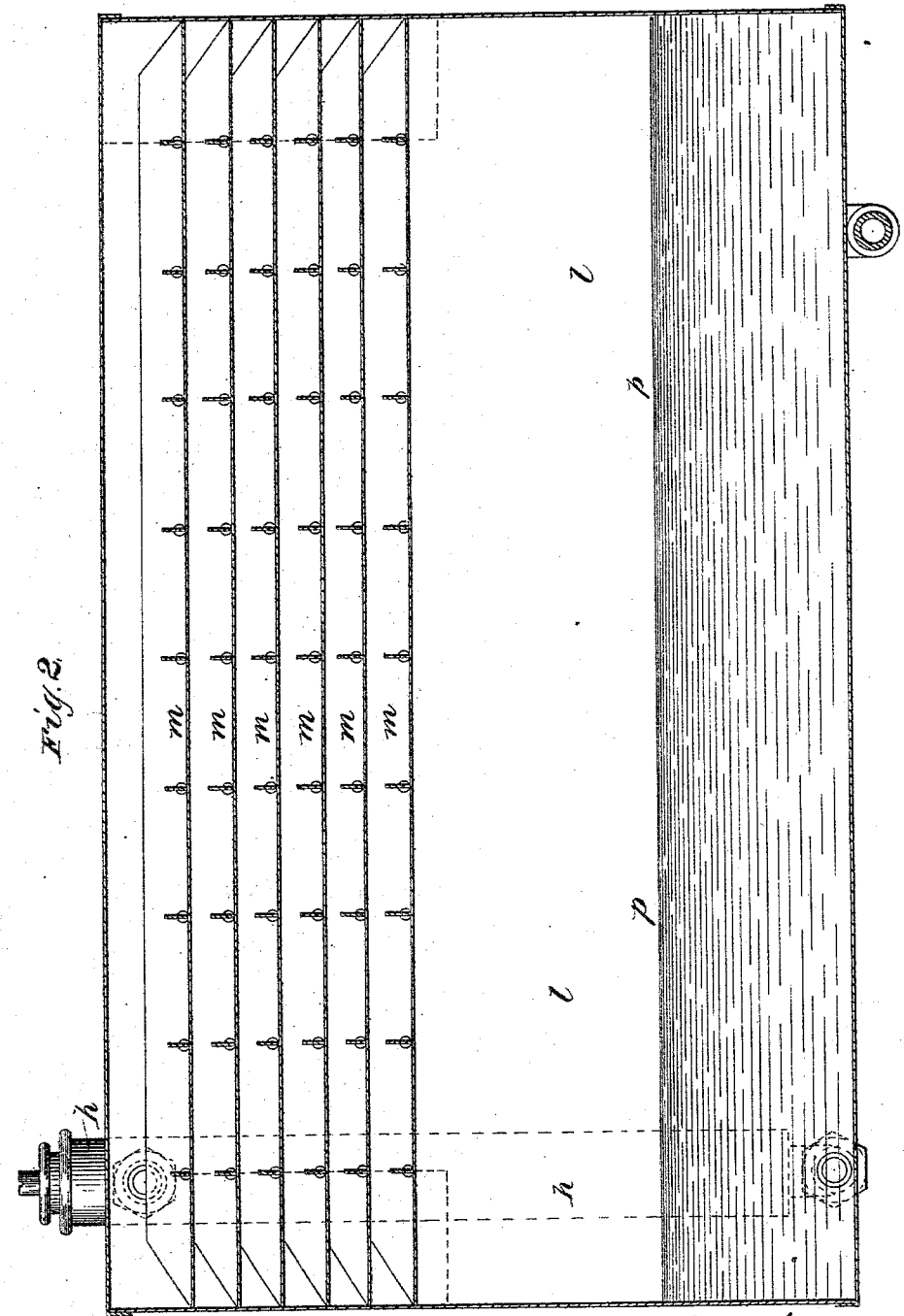

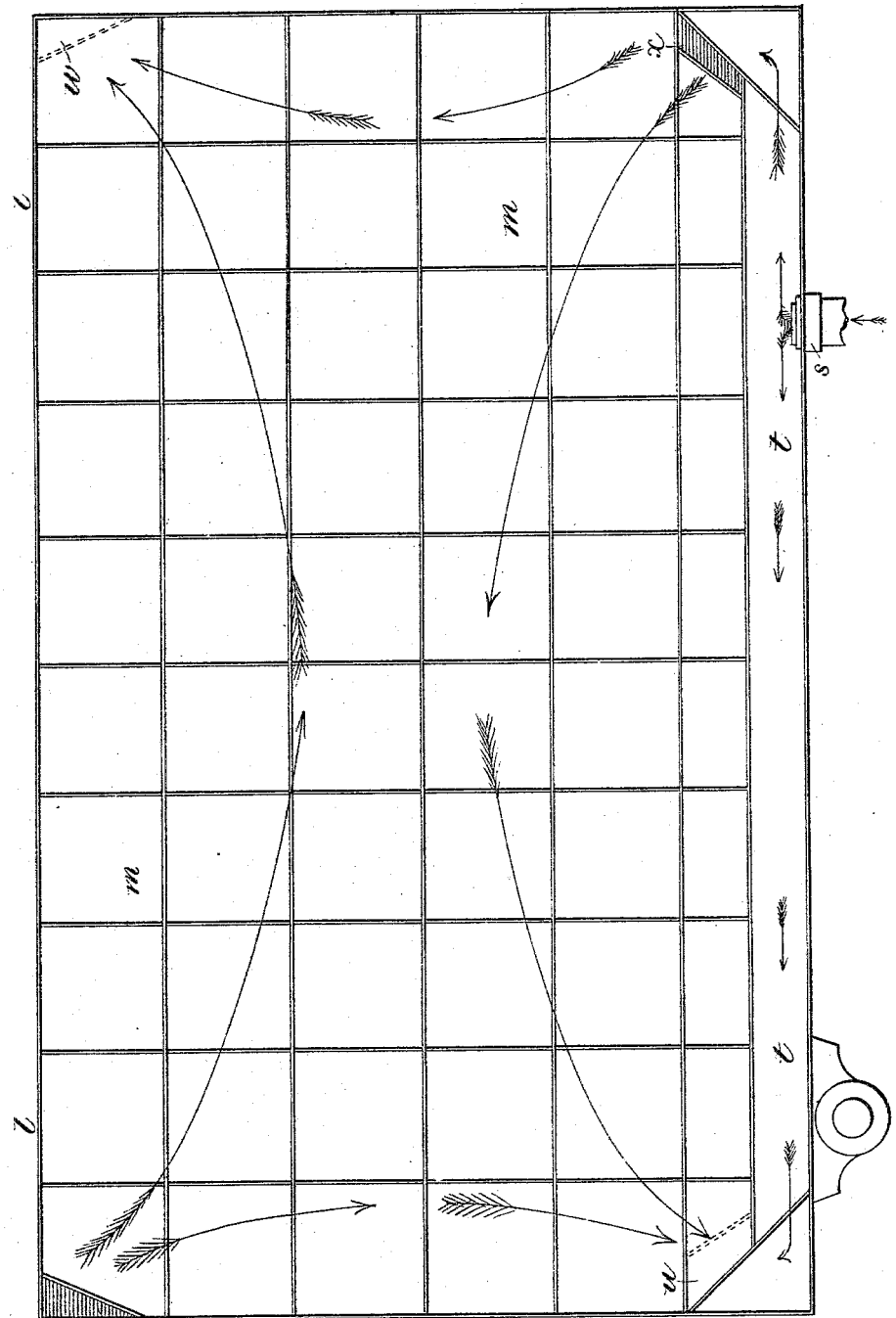

(No Model.) 5 Sheets—Sheet 4.
H. L. MÜLLER.
COMBINED GAS ENGINE AND CARBURETING APPARATUS.
No. 288,952. Patented Nov. 20, 1883.
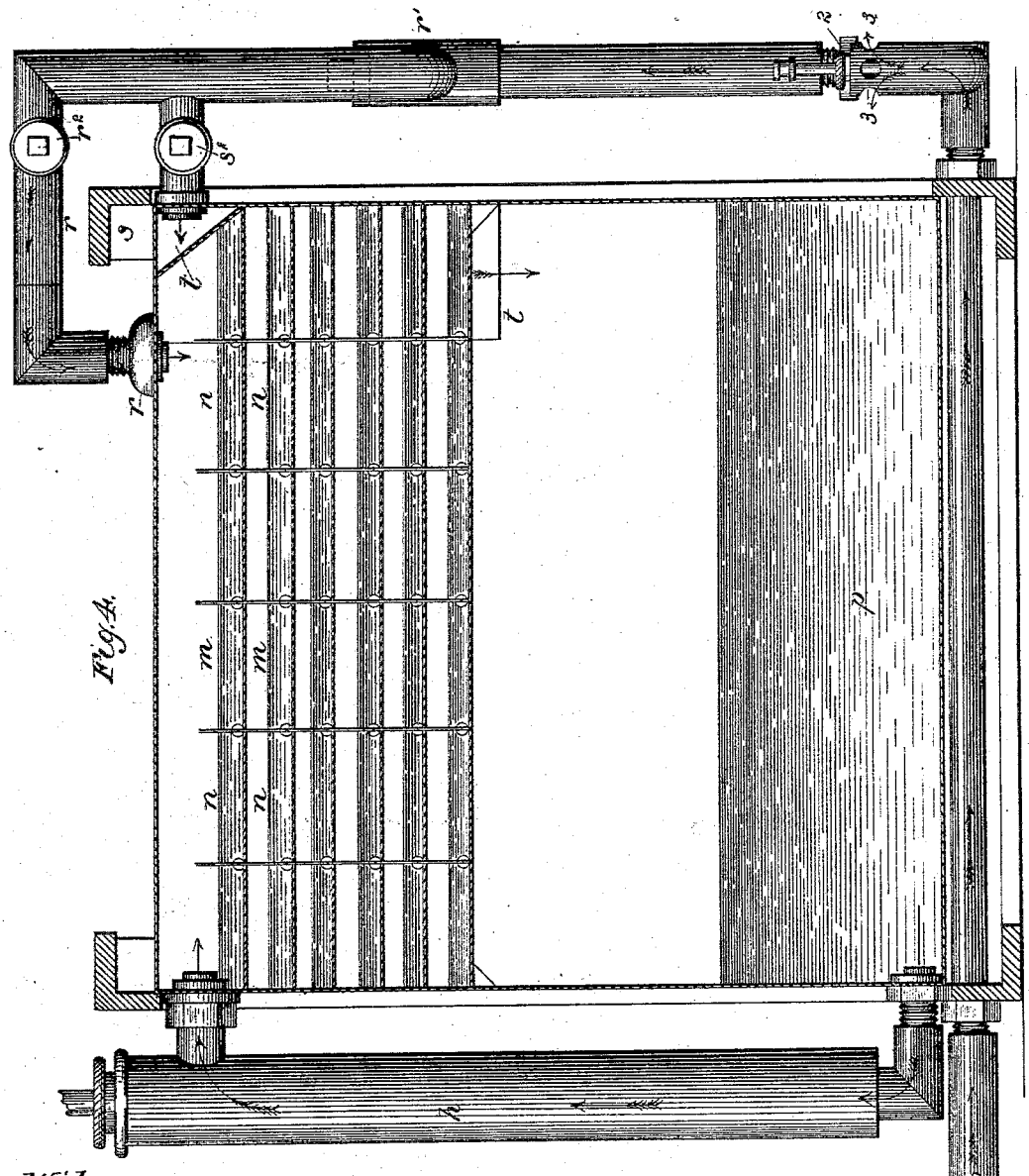

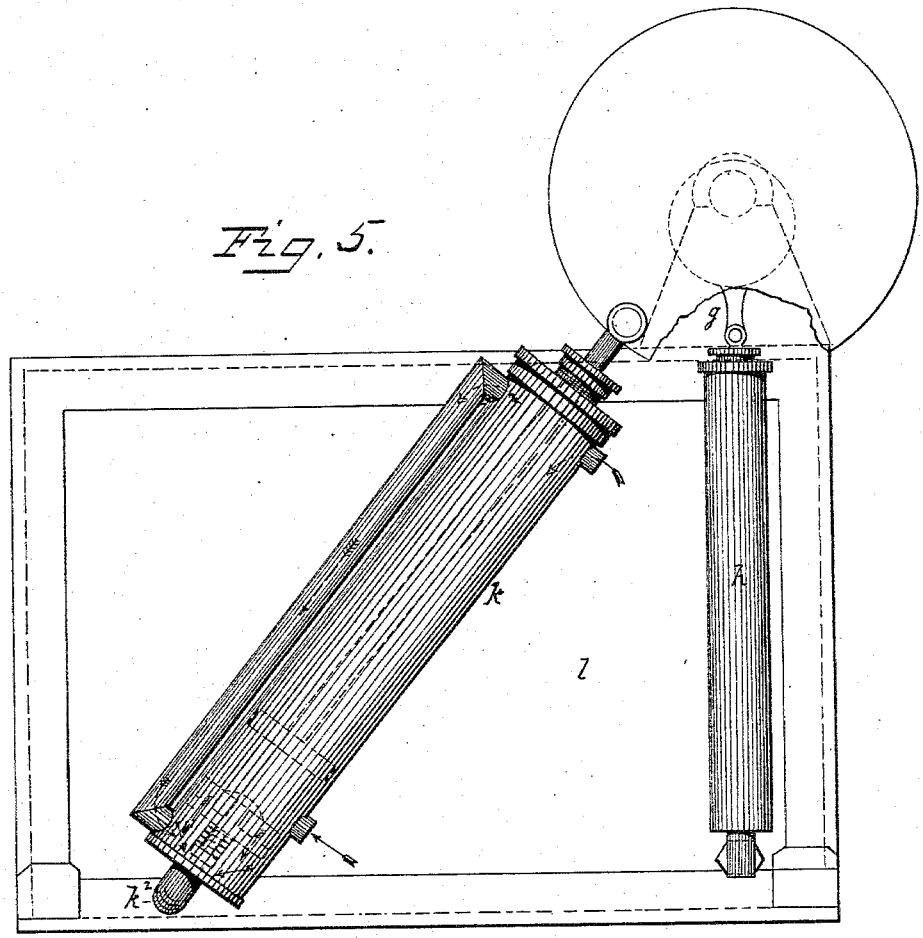

UNITED STATES PATENT OFFICE.

HENRY L. MÜLLER, OF BIRMINGHAM, ENGLAND.

COMBINED GAS-ENGINE AND CARBURETING APPARATUS.

SPECIFICATION forming part of Letters Patent No. 288,952, dated November 20, 1883.

Application filed December 14, 1881. (No model.) Patented in England November 20, 1880, No. 4,819, and in France December 22, 1880, No. 128,413.

*To all whom it may concern:*

Be it known that I, HENRY LEERHOFF MÜLLER, of Birmingham, England, have invented certain new and useful Improvements in Combined Gas-Engine and Carbureting Apparatus; and I do hereby declare that the following is a full, clear, and exact description of the invention, which will enable others skilled in the art to which it appertains to make and use the same.

My invention relates to such gas-engines as are worked by a gaseous mixture of atmospheric air and the vapor of gasoline or other volatile liquid hydrocarbon; and my said invention consists of the arrangements or combinations of parts hereinafter described, whereby the gas-engine is made to supply the motive power required to force atmospheric air through the apparatus, and to effect the impregnation of atmospheric air with the hydrocarbon vapor and produce an inflammable gaseous vapor.

I combine with the gas-engine a carburetor constructed, preferably, in the following manner, which can either be attached to the engine in the manner shown in the drawings or made to form a separate part attached by suitable piping or other connections.

The said carburetor consists of a closed vessel having a series of horizontal trays containing gasoline or other volatile liquid hydrocarbon, and so arranged that a current of air rising from the bottom of the vessel to the top has to describe a zigzag path passing over the said trays and taking up and becoming impregnated with the vapor of any volatile liquid contained in the trays. The lower part of the vessel contains a store of gasoline or other liquid volatile hydrocarbon, and the upper part is charged with the impregnated or inflammable gaseous mixture produced. Air is admitted into the carburetor by means of two pipes provided with stop-cocks. One of these pipes passes down to the lowest tray, and the other opens into the top tray only of the carburetor. Air is introduced through the first-named pipe, and, passing over the gasoline contained in the lower part of the carburetor and over all the trays in succession, becomes highly charged with the vapor of gasoline, while air introduced through the other pipe passes over the top tray only and becomes only feebly charged with the vapor of gasoline. The two pipes described receive air from a common supply-pipe, and by means of the stop-cocks with which the two pipes are provided the proportion between the feebly and too highly charged currents may be so regulated that the mixture of the two passing out of the carburetor shall have the required quality.

In order to force the required current of air under pressure through the carburetor, I employ, preferably, a double-action air-pump, whereby a current of air is forced through the carburetor; but bellows or other equivalent contrivance may be employed. The inflammable gaseous mixture produced in the carburetor passes out by a pipe at its top, situated near the side opposite that at which the pipe delivering air into the top of the carburetor is situated. The pump or bellows by which the air is forced through the carburetor is worked by the gas-engine. The gasoline is raised from the bottom of the carburetor preferably by means of a pump worked by the engine, the said pump delivering the gasoline onto the top tray, from which it falls to the others, the trays being thus kept charged with the gasoline. The quantity of air passed through the carburetor, and consequently the quantity of inflammable gaseous mixture produced, may be only as much as may be required to work the gas-engine, or such additional quantity as may be required for lighting or heating purposes. In the latter case the inflammable gaseous mixture may be passed from the carburetor into a gas-holder of any required dimensions; but I prefer to use a small pair of bellows or gas-bag with a regulating-valve, so that whether one or more lights be used there may always be a regular pressure at each burner.

I will now proceed to describe, with reference to the accompanying drawings, the manner in which my invention may be practiced.

Figure 1 represents in side elevation a part of a gas-engine containing my improvements or additions. Fig. 2 represents a longitudinal section of the carburetor used with the gas-engine. Fig. 3 represents a plan; Fig. 4, a cross-section of the carburetor; and Fig. 5 is a side elevation taken from the opposite side from Fig. 1.

The same letters indicate the same parts in the several figures of the drawings.

$a$ is the cylinder of the gas-engine, and $b$ the piston of the said cylinder. By the reciprocating motion of the piston $b$ motion is communicated by the crank-rod $c$ to the crank $d$ on the shaft $e$. The shaft $e$ is the main shaft of the gas-engine, from which motive power is obtained. The pumps of the carburetor are worked from the shaft $e$ in the following manner: $f$ is an eccentric on the shaft $e$, by the clip $g$ of which the pump $h$ is worked. $i$ is a crank-plate of the shaft $e$, by the rotation of which the air-pump $k$ is worked. The pump $k$ oscillates on its pivot $k^2$. $l$ is the carburetor, containing a series of horizontal trays, $m\ m$, subdivided in a manner which insures an even and constant supply of gasoline therein. These trays contain layers of gasoline, $n$. A store of gasoline, $p$, is contained in the lower part of the carburetor, and is pumped up by the pump $h$ and delivered on the top tray, from which it descends through the overflow-holes $u\ w\ x\ y$ from the top to the second, and from the second to the third, and so on to the bottom tray, (see Fig. 3,) the overflow returning into the lower part of the carburetor. The apertures $u\ w\ x\ y$ also act as outlets for the passage of the air in the opposite direction. The current of air to be impregnated with the vapor of gasoline is forced through the carburetor by the pump $k$. The said air enters the carburetor by the two pipes $r\ s$, provided with a check-valve, $r'$ and stop-cocks $r^2\ s^2$, by which the air entering the carburetor may be regulated. The air entering by the pipe $r$ is delivered on the gasoline $n$ in the top tray, and being exposed only to the gasoline in one tray is only partially impregnated with the vapor of gasoline. The air entering by the pipe $s$ passes through the passage $t$ in front and at each end of the carburetor, and is delivered underneath the bottom tray. Rising through the passages $u$ and $w$, it passes in the direction of the arrows, Fig. 3, and, ascending through the passages $x\ y$, is exposed to the gasoline in the bottom tray but one, passing over the same in the direction of the arrows. From this tray the air passes to the next tray above through passages in a similar position to those in the bottom tray at $u$ and $w$, and in this way makes a zigzag path and passes over the gasoline in the several trays in succession. The air is thereby very highly impregnated with the vapor of gasoline, and on reaching the upper part of the carburetor may be diluted with the feebly-impregnated air, which may be delivered through the pipe $r$. By means of the stop-cocks $r^2\ s^2$ the mixture of air and vapor may be made to contain a greater or less proportion of the vapor of gasoline, as may be required. The quantity of air passed through the carburetor by the pump $k$ may be regulated by means of the valve 2, Fig. 1, controlled by the governor $G^2$. By means of this valve a greater or less quantity of air forced by the pump $k$ is allowed to escape through the holes 3, the remainder passing to the carburetor in the quantity required for actuating the engine, or for illumination, as may be required. The gasoline is introduced into the bottom of the carburetor by the pipe 5—an arrangement which admits of the carburetor being replenished while the engine is working. A float, 6, provided with a cap, 7, indicates at any time, by unscrewing the said cap, the quantity of gasoline in reserve in the carburetor. The impregnated air or vapor passes out of the carburetor by the pipe 4, and is conveyed directly to the gas-engine for working the same; or, when part of the gas produced is required for illuminating or other purposes, I pass it into a suitable gas-holder, bellows, or bag, from which also the supply to work the gas-engine can be taken, if more convenient.

I do not limit myself to the use of a pump of the kind described and illustrated for forcing air through the carburetor; neither do I limit myself to the kind of pump described and illustrated for raising the gasoline from the bottom of the carburetor and delivering it into the trays, as other equivalent apparatus may be employed.

Having now described the nature of my invention and the manner in which the same is to be practiced, I wish it to be understood that I claim as my invention—

The combination, with a gas-engine, of a carburetor supplying a mixture of air and the vapor of a volatile liquid hydrocarbon for operating said engine and for illuminating purposes, a device for forcing air through the carburetor, a pump or its equivalent for raising the liquid hydrocarbon to the trays of said carburetor, a supply-pipe connecting the carburetor with the gas-engine, and mechanism connecting the gas-engine with the air-forcing and liquid-raising devices, substantially as described.

HENRY LEERHOFF MÜLLER.

Witnesses:
WILLIAM CHASE BARRY.
FRANK KINGSCOTE TOZER.